United States Patent  (10) Patent No.: US 11,460,142 B2
Cunningham et al.  (45) Date of Patent: Oct. 4, 2022

(54) SENSOR NETWORK FOR SUBSURFACE IMPACT PROTECTION SYSTEM

(71) Applicant: Saudi Arabian Oil Company, Dhahran (SA)

(72) Inventors: Vincent Cunningham, Thuwal (SA); Iqbal Hussain, Khobar (SA)

(73) Assignee: Saudi Arabian Oil Company, Dhahran (SA)

(*) Notice: Subject to any disclaimer, the term of this patent is extended or adjusted under 35 U.S.C. 154(b) by 112 days.

(21) Appl. No.: 16/715,809

(22) Filed: Dec. 16, 2019

(65) Prior Publication Data
US 2021/0180737 A1   Jun. 17, 2021

(51) Int. Cl.
*F16L 57/02* (2006.01)
*H04Q 9/00* (2006.01)
*G01L 5/00* (2006.01)

(52) U.S. Cl.
CPC ............ *F16L 57/02* (2013.01); *H04Q 9/00* (2013.01); *G01L 5/0052* (2013.01); *H04Q 2209/30* (2013.01); *H04Q 2209/40* (2013.01)

(58) Field of Classification Search
CPC ....... F16L 57/02; H04Q 9/00; H04Q 2209/00; H04Q 2209/10; H04Q 2209/25;
(Continued)

(56) References Cited

U.S. PATENT DOCUMENTS 6,999,021 B2   2/2006  Taylor, Jr. et al.
8,106,763 B2 * 1/2012  Otterbach .............. G08C 19/00
                                                 340/512
(Continued)

FOREIGN PATENT DOCUMENTS

CA   1305795 C   7/1992
CA   2305148 A1  4/1999
(Continued)

OTHER PUBLICATIONS

International Search Report and Written Opinion in Corresponding PCT Application No. PCT/US2020/064849 dated Mar. 31, 2021. 9 pages.
(Continued)

*Primary Examiner* — Franklin D Balseca
(74) *Attorney, Agent, or Firm* — Leason Ellis LLP (57) ABSTRACT

A subsurface impact protection system for protecting an underground structure is provided. The protection system includes a subsurface polymer layer above the underground structure which is configured to absorb above-ground impact force from reaching the underground structure. A sensor network is embedded in the polymer layer. The sensor network includes a plurality of sensors configured to monitor the polymer layer by generating a corresponding plurality of sensor signals of conditions near the polymer layer and transmitting the generated sensor signals to one or more external receivers. In some embodiments, the polymer layer includes a protective mesh made up of a plurality of high density polyethylene (HDPE) strands in a woven pattern. In one such embodiment, the sensors occupy gaps in the protective mesh. A method of protecting an underground structure is also provided.

20 Claims, 5 Drawing Sheets

(58) Field of Classification Search
CPC ........... H04Q 2209/30; H04Q 2209/40; H04Q 2209/80; H04Q 2209/88; G01L 5/0052
See application file for complete search history.

(56) References Cited

U.S. PATENT DOCUMENTS

| | | | |
|---|---|---|---|
| 9,909,708 B1* | 3/2018 | Penland, Jr. | ............ F16L 57/00 |
| 10,436,667 B2* | 10/2019 | Littlestar | ............... G01M 3/005 |
| 10,856,056 B2* | 12/2020 | Ham | ........................ H04Q 9/00 |
| 2010/0227557 A1* | 9/2010 | Won | ........................ H04Q 9/00 |
| | | | 455/41.2 |
| 2013/0118247 A1 | 5/2013 | Akbari et al. | |

FOREIGN PATENT DOCUMENTS

| | | |
|---|---|---|
| CN | 2136382 Y | 6/1993 |
| CN | 201774212 U | 3/2011 |
| CN | 103712067 A | 4/2014 |
| KR | 960022185 A | 7/1996 |
| KR | 101529563 B1 | 6/2015 |

OTHER PUBLICATIONS

Da Silva, Agnelo Rocha, Mahta Moghaddam, and Mingyan Liu. "The future of wireless underground sensing networks considering physical layer aspects." The Art of Wireless Sensor Networks. Springer, Bedin, Heidelberg, 2014. 451-484.

Toma, Daniel Mihai, Joaquin del Rio, and Antoni Mànuel-Làzaro. "Self-powered high-rate wireless sensor network for underground high voltage power lines." 2012 IEEE International Instrumentation and Measurement Technology Conference Proceedings. IEEE, 2012.

* cited by examiner

SENSOR NETWORK FOR SUBSURFACE IMPACT PROTECTION SYSTEM

FIELD OF THE DISCLOSURE

The present disclosure relates generally to a sensor network, and specifically to a sensor network for monitoring in an around a subsurface impact protection system, such as a sensor network for inspecting and monitoring protected underground assets.

BACKGROUND OF THE DISCLOSURE

The encroachment of existing buried high-pressure pipeline corridors and storage vessels due to factors such as above-ground building and construction activities presents a high risk to the integrity of the underground pipelines and vessels. This can result in a loss of product from leaks in the underground structures caused by external damage, which can lead to health, safety, and environmental issues. The protection of buried pipeline networks from impact damage is important to operators of the pipelines and other third parties that have a vested interest where encroachment is taking place.

It is in regard to these and other problems in the art that the present disclosure is directed to provide a technical solution for an effective sensor network for monitoring in an around a subsurface impact protection system.

SUMMARY OF THE DISCLOSURE

According to an embodiment, a subsurface impact protection system for protecting an underground structure is provided. The protection system comprises: a subsurface polymer layer above the underground structure and configured to absorb above-ground impact force from reaching the underground structure; and a sensor network comprising a plurality of sensors embedded in the polymer layer. The sensor network is configured to monitor the polymer layer by: generating, using the plurality of sensors, a corresponding plurality of sensor signals of conditions near the polymer layer; and transmitting the generated sensor signals to one or more external receivers.

In an embodiment, the plurality of sensors comprise active sensors, and the sensor network further comprises one or more power lines electrically connecting the active sensors to at least one electrical power source, the one or more power lines being configured to supply electrical power from the at least one electrical power source to the active sensors.

In an embodiment, the sensor network further comprises a corresponding plurality of data lines connected to the plurality of sensors, which transmit the generated sensor signals using the data lines.

In an embodiment, the polymer layer comprises high density polyethylene (HDPE).

In an embodiment, the polymer layer comprises a protective mesh, and the protective mesh comprises a plurality of polymer strands in a woven pattern.

In an embodiment, the sensors occupy gaps in the protective mesh.

In an embodiment: the sensor network further comprises a corresponding plurality of wireless transmitters connected to the plurality of sensors through a corresponding plurality of data lines; and transmitting the generated sensor signals comprises delivering the generated sensor signals to the wireless transmitters using the data lines, and wirelessly transmitting the delivered sensor signals using the wireless transmitters.

In an embodiment, wirelessly transmitting the delivered sensor signals comprises using a radio frequency of between 300 megahertz (MHz) and 2400 MHz.

In an embodiment, the polymer layer comprises a protective mesh, the protective mesh comprises a plurality of polymer strands in a woven pattern, the sensors occupy first gaps in the protective mesh, and the wireless transmitters occupy second gaps in the protective mesh different from the first gaps.

In an embodiment, the plurality of sensors comprise one or more of a pressure sensor, a temperature sensor, and a humidity sensor.

According to another embodiment, a method of protecting an underground structure is provided. The method includes: absorbing above-ground impact force from reaching the underground structure using a subsurface polymer layer above the underground structure; and monitoring the polymer layer using a sensor network comprising a plurality of sensors embedded in the polymer layer. The monitoring step comprises: generating, using the plurality of sensors, a corresponding plurality of sensor signals of conditions near the polymer layer; and transmitting the generated sensor signals to one or more external receivers.

In an embodiment, the plurality of sensors comprise active sensors, and the method further comprises supplying electrical power from at least one electrical power source to the active sensors using one or more power lines of the sensor network, wherein the one or more power lines electrically connect the active sensors to the at least one electrical power source.

In an embodiment, the sensor network further comprises a corresponding plurality of data lines connected to the plurality of sensors, which transmit the generated sensor signals using the data lines.

In an embodiment, the polymer layer comprises high density polyethylene (HDPE).

In an embodiment, the polymer layer comprises a protective mesh, and the protective mesh comprises a plurality of polymer strands in a woven pattern.

In an embodiment, the sensors occupy gaps in the protective mesh.

In an embodiment: the sensor network further comprises a corresponding plurality of wireless transmitters connected to the plurality of sensors through a corresponding plurality of data lines; and transmitting the generated sensor signals comprises delivering the generated sensor signals to the wireless transmitters using the data lines, and wirelessly transmitting the delivered sensor signals using the wireless transmitters.

In an embodiment, wirelessly transmitting the delivered sensor signals comprises using a radio frequency of between 300 megahertz (MHz) and 2400 MHz.

In an embodiment, the polymer layer comprises a protective mesh, the protective mesh comprises a plurality of polymer strands in a woven pattern, the sensors occupy first gaps in the protective mesh, and the wireless transmitters occupy second gaps in the protective mesh different from the first gaps.

In an embodiment, the plurality of sensors comprise one or more of a pressure sensor, a temperature sensor, and a humidity sensor.

Any combinations of the various embodiments and implementations disclosed herein can be used. These and other aspects and features can be appreciated from the following

BRIEF DESCRIPTION OF THE DRAWINGS

It is noted that the drawings are illustrative and not necessarily to scale, and that the same or similar features have the same or similar reference numerals throughout.

DETAILED DESCRIPTION OF CERTAIN EMBODIMENTS OF THE DISCLOSURE

In various example embodiments, a sensor network for a subsurface impact protection system is provided. The subsurface impact protection system is used to protect buried or subsurface infrastructure (e.g., pipelines, storage vessels, or the like) from above-ground impact damage. The sensor network provides a way to actively monitor the protection system and the protected infrastructure below it. The protection system can be fabricated, for example, in a mesh or plate structure of thermoplastic polymer, such as high-density polyethylene (HDPE), above the underground structure to be protected (and below the surface of the ground). The HDPE mesh or plate structure is used in lieu of concrete slabs to protect the underground structure. This HDPE mesh or plate structure is more cost effective and provides the same level of protection as the concrete slabs. The HDPE mesh or plate structure also effectively shields the underground structure and protects it from above-ground impact damage. In some embodiments, sensing devices (that make up the sensor network) are incorporated in the HDPE mesh or plates. The sensing devices monitor and inspect the buried assets that make up the underground structure.

As discussed earlier, there are a number of problems associated with protecting underground structures, such as buried pipelines and storage vessels. Two ways of protecting buried pipelines from above-ground impact damage are by either increasing the pipe thickness or by using heavy duty concrete slabs over the pipeline. Both methods have drawbacks, for example, in that they are labor intensive and costly, require significant earth removal (trenching), and result in heavier underground structures.

Accordingly, in example embodiments, a sensor network for a subsurface impact protection system is provided. The sensor network includes sensing devices that inspect and monitor different conditions or parameters, such as pressure, temperature, humidity, or the like, near the impact protection system. The sensor network is capable of identifying abnormal behavior of buried assets (such as pipelines or storage vessels) being protected by the subsurface impact protection system. For instance, the sensor network includes programmable, reconfigurable, or custom logic or circuits configured (e.g., programmed or otherwise designed) to carry out the intended sensing or other control tasks (such as identifying any abnormal behavior). The sensing devices are part of a mesh or plate structure of HDPE making up the protection system. For ease of description, the protection system will usually be described as being made up of a mesh (e.g., woven strands) of HDPE or other polymers, though other embodiments are not necessarily so limited. For example, in some other embodiments, a HDPE (or other polymer) plate structure makes up the protection system.

The sensing devices make up a sensor network embedded in (e.g., part of, directly or closely attached to, or surrounded by) the protective mesh. The protective mesh is for the protection of underground assets (e.g., pipelines, storage vessels, and other structures). The sensor network provides information on the structure or integrity of the mesh. The protective mesh provides a platform for efficient installation of the sensor network. The protective mesh provides the ideal localization of the sensors. The protective mesh provides the ideal depth position of the sensors. The sensors and their data help infer the health of the asset(s) under protection and their surrounding underground environment. These sensing devices can include, for example, pressure sensors, temperature sensors, and humidity sensors, to name a few.

In some embodiments, the sensor network is incorporated in a protective mesh and measures the pressure on the mesh from external forces (e.g., stress and strain caused by weight on the external surface). The sensor network also measures shifts in ground movements as well as subsurface collapse, which would result in a measurable change of pressure on the mesh.

In some embodiments, the sensor network is incorporated in a protective mesh and measures the temperature of the mesh. It should be noted that a change in temperature can be due to normal circumstances such as seasonal temperature changes. However, an abrupt or unexpected change in temperature can infer a leak in the protected asset.

In some embodiments, the sensor network is incorporated in a protective mesh and measures the humidity. Like temperature, humidity can change due to normal conditions, such as the humidity fluctuations associated with seasonal changes or the weather, which can be filtered. However, an abrupt or unexpected change in humidity can also infer a leak in the protected asset.

In some embodiments, the sensor network incorporates vibrational sensors that monitor seismic activities. Vibration sensing in such sensors can indicate above-surface fluctuations in pressure (such as increased traffic). Such sensing can also be indicative of subsurface vibrations, which may come from the pipe (such as the flow of liquid in the pipe). Vibrational sensors can also be used to monitor activities resulting from leaks.

In some embodiments, the sensor network is incorporated into a protective mesh and measures cathodic protection potentials of the buried assets (e.g., pipelines). Real-time data from sensors embedded in the mesh are used to provide data on conditions such as soil resistivity and whether the buried pipeline is being adequately cathodically protected.

In some embodiments, the sensor network is incorporated in a protective mesh and includes gas leak sensors, such as for pipelines and storage vessels that house or transport gases (with or without liquids). The gas leak sensors detect gas or elements of gas. A detection of an unexpected gas can be due, for example, to a leak in the pipeline network or vessel.

In some embodiments, the sensor network is part of a protective mesh and provides assisted navigation and location functions, such as with respect to the protected mesh or the assets being protected. For example, the sensor network can be programmed or otherwise configured to provide assisted navigation of the assets being protected along with location identification of the buried assets. This can help facilitate and aid with future maintenance or repair (such as emergency repair) programs of the mesh or the buried assets.

In some embodiments, the sensor network is part of a protective mesh and is programmed or otherwise configured to provides security services (such as with security sensors) to protect the buried assets. For example, in one such embodiment, the sensor network provides an alarm or alert in case of any breach of security on the protected asset or assets. This is useful for high priority or strategic buried assets or critical buried infrastructure (e.g. strategic pipeline networks).

In some embodiments, the sensor network is part of a protective mesh and measures or otherwise senses the integrity of the protective mesh. In some such embodiments, the sensor network includes one or more control circuits programmed (or otherwise configured) to provide useful information on the integrity of the mesh itself. For example, the installed mesh may degrade over time due to adverse effects of soil, moisture, and ground movement. The sensor network detects (or more specifically, a control circuit is programmed or configured to detect) areas of mesh degradation and that would benefit from preventative or timely maintenance.

Different embodiments provide for different communication and sensor deployment attributes. For example, in some embodiments, wired sensors are connected and communicate to an above-ground station or stations using wired communication links. In some such embodiments, a series of wired sensors are connected, where the protective mesh acts as a conduit for the wiring. This wired solution is useful for sensors that require power to operate (e.g., active sensors). The wiring not only provides power to the sensors, but also facilitates the transfer of information to and from the sensors. In some such embodiments, the above-ground station or stations serve as both the source of power distributed through the wired sensors, and as the receiver of data and information from the wired sensors.

In some other embodiments, wireless sensors and corresponding transmitters are connected together, and communicate to an above-surface station or stations (such as corresponding above-surface stations) by each wirelessly transmitting or relaying their information and measurements to an above-ground station or readout point. It should be noted that the deployment depth of the sensors and transmitters is important, especially when considering communication transmission frequencies in the range of 300 megahertz (MHz)-2400 MHz. In some such embodiments, the protective mesh is for locations at depths of less than one meter. In this scenario, each sensor and transmitter pair have a power supply. In some such embodiments, this power is supplied via wire transmission using the mesh as a conduit for the wiring. In some other such embodiments, this power is supplied by a battery connected to the sensor and transmitter.

In some embodiments, the underground sensors communicate via a relay. Here, the sensors transfer the information and data to each other (e.g., swarm), aggregating the information and data at a central underground hub for transmission to the surface (e.g., wireless or wired transmission). This surface transmission can be powered, for example, via wired transmission of power using the mesh as a conduit for the wiring, or by a battery connected to the sensor or hub. In some such embodiments, increased subsurface depth range is achieved for the sensors (e.g., deep sensor allocation) by having deep located sensors transmit information upwards to other (less deep) sensors or hubs, or laterally to a buried sensor central hub. This central hub can be powered, for example, via wired transmission of power using the mesh as a conduit for the wiring, or by a battery connected to the central hub.

In some embodiments, a protective mesh is used to protect underground assets, such as pipelines or storage vessels, from subsurface impact damage. In some such embodiments, the protective mesh is made of HDPE. In some such embodiments, the protective mesh is delivered through a mechanized delivery system situated above ground and including spooled thermoplastic polymer mesh on reels. In one such embodiment, the spooled thermoplastic mesh is mechanically threaded below the subsurface from above ground. This creates an impact resistant barrier above the pipeline(s) to be protected. In some other such embodiments, polymer mesh having sufficient impact resistance is provided to protect a buried asset from subsurface impact damage. The polymer mesh can be provided, for example, when installing or otherwise accessing (e.g., trenching) the asset or underground region above the asset. The polymer mesh can be transported to the site on spools ready to be deployed as part of the subsurface impact protection system.

Once installed or otherwise deployed, the polymer mesh forms an efficient underground protective impact resistant barrier of buried structures, such as against accidental third-party damage (e.g., an excavator). Buried structures of any sort, such as pipelines, electric cabling, fiber optics, and the like, can be protected using the polymer mesh. In an example embodiment, the placement of the mesh is carried out through digging, trenching, and back filling. In addition, incorporating a sensor network embedded into the protective mesh can provide valuable information and data on, for example, the structure or integrity of the mesh. This can further be used to infer the health of the asset under protection and its surrounding underground environment. The sensor network can include, for example, pressure sensors, temperature sensors, humidity sensors, location tags, and the like. In some embodiments, the sensor network is embedded through being pre-installed on the polymer mesh during manufacture. In some other embodiments, the sensor network is embedded into the polymer mesh on site.

The described techniques herein can be implemented using a combination of sensors, transmitters, and other devices including computing or other logic circuits configured (e.g., programmed) to carry out their assigned tasks. These devices are located on or in (or otherwise in close proximity to) the protective mesh or layer making up the subsurface impact protection system. In some example embodiments, the control logic is implemented as computer code configured to be executed on a computing circuit (such as a microprocessor) to perform the control steps that are part of the technique. For ease of description, this processing logic (e.g., ASIC, FPGA, processor, custom circuit, or the like) will be referred to as a control circuit throughout. For further ease of description, this control circuit will be programmable by code to perform the control logic (or otherwise customize the circuit to perform its intended purpose).

Figure 1:
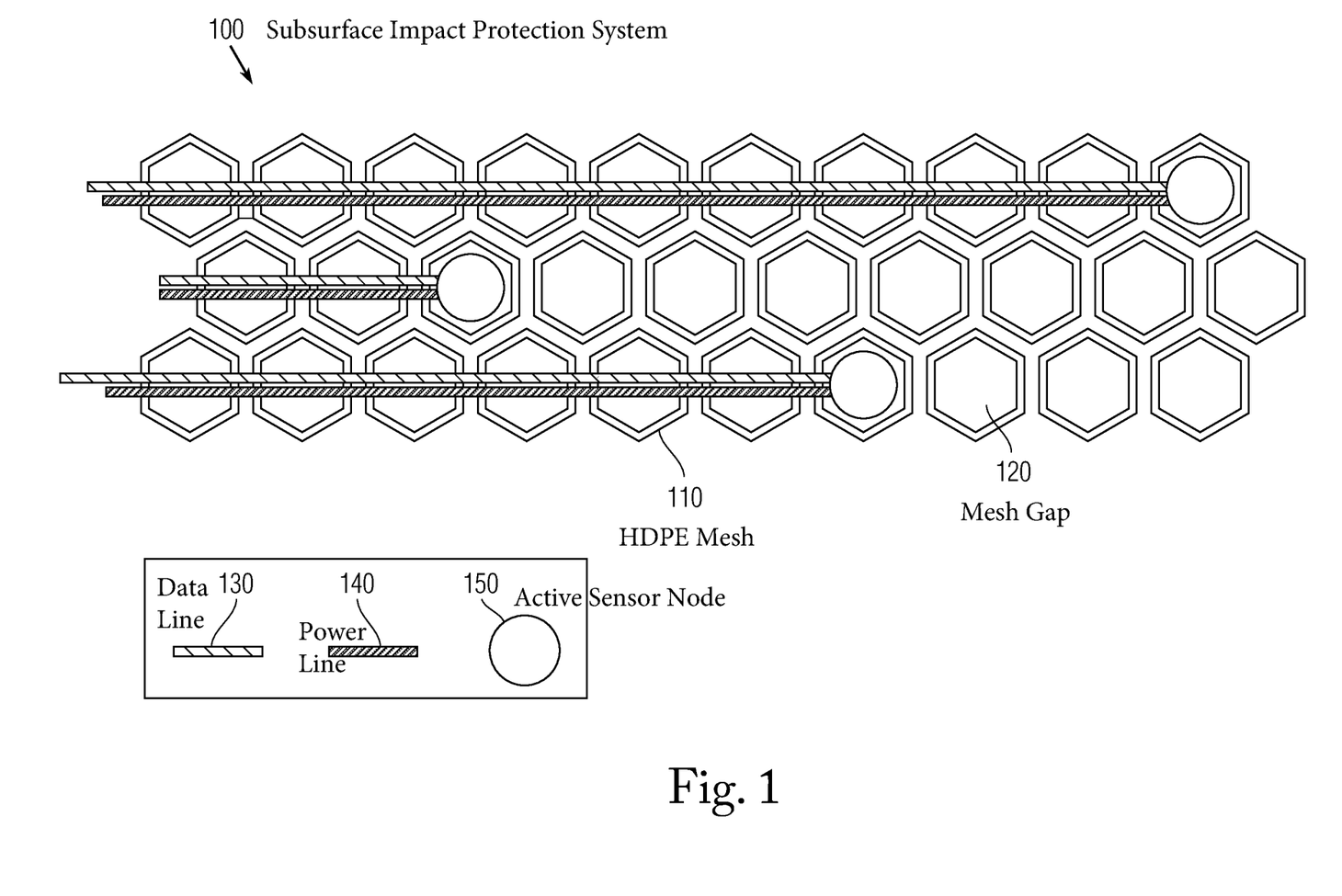
FIG. 1 is an illustration of an example sensor network embedded in a polymer layer (e.g., a mesh or plate structure) of a subsurface impact protection system, according to an embodiment.

FIG. 1 is an illustration of an example sensor network embedded in a polymer layer (e.g., a mesh or plate structure) of a subsurface impact protection system 100, according to an embodiment. The sensor network is an example of an active sensor node mesh. Here, the protection system 100 includes a polymer (e.g., HDPE) mesh 110, which provides a useful platform as well as protection for the embedded sensor network. The sensor network includes numerous active sensor nodes 150. Active sensors require external power to operate. As such, each active sensor node 150 requires an external power source to work as intended. In this case, power lines 140 (e.g., wires) deliver power to the active sensor nodes 150. In addition, data lines 130 electronically transmit sensor data from the active sensor nodes 150 (e.g., to external receivers).

For ease of illustration and description, the polymer mesh 110 is illustrated in this and other drawings herein as a hexagonal pattern of HDPE mesh 110 with mesh gaps 120 between the solid HDPE portions 110. However, that is but one example implementation, and other embodiments are not necessarily limited to that arrangement or polymer material. For example, in some other embodiments, the polymer mesh and mesh gaps are in a different pattern (such as squares or triangles), as would be apparent in light of the present disclosure. In some embodiments, the polymer mesh is composed of a woven pattern of HDPE (and possibly other polymer) strands.

For some mesh-type implementations of the protection system, the active sensor nodes 150 are located in different mesh gaps 120. Likewise, for some plate-type implementations of the protection system, the active sensor nodes are embedded in the plates. The protection system 100 in FIG. 1 includes an active sensor configuration. Each of the active sensor nodes 150 receives electrical power and transmits resultant data along corresponding power wires 140 that are deployed along with the mesh. In further detail, data lines 130 receive and transmit data and information from the sensor nodes 150 to a receiving node, station, or other circuit for further processing or retransmission. Power lines 140 transmit electrical power to the sensor nodes 150 from a power supply, such as an external supply.

The sensor nodes 150 are distributed appropriately (e.g., sparsely, densely) throughout the mesh gaps 120 to provide sufficient coverage for their intended purpose, balancing factors such as cost, redundancy, wiring complexity, and the like. The sensor nodes 150 receive protection from the polymer mesh 110 by being embedded in the mesh gaps 120. In a similar manner, the data lines 130 and power lines 140 are protected by the polymer mesh 110 by being part of or attached to the polymer strands making up the mesh 110. Likewise, for a polymer plate implementation, the sensor nodes 150, data lines 130, and power lines 140 are embedded in (such as part of or closely attached to) the polymer plates and receive protection from the polymer plates.

Figure 2:
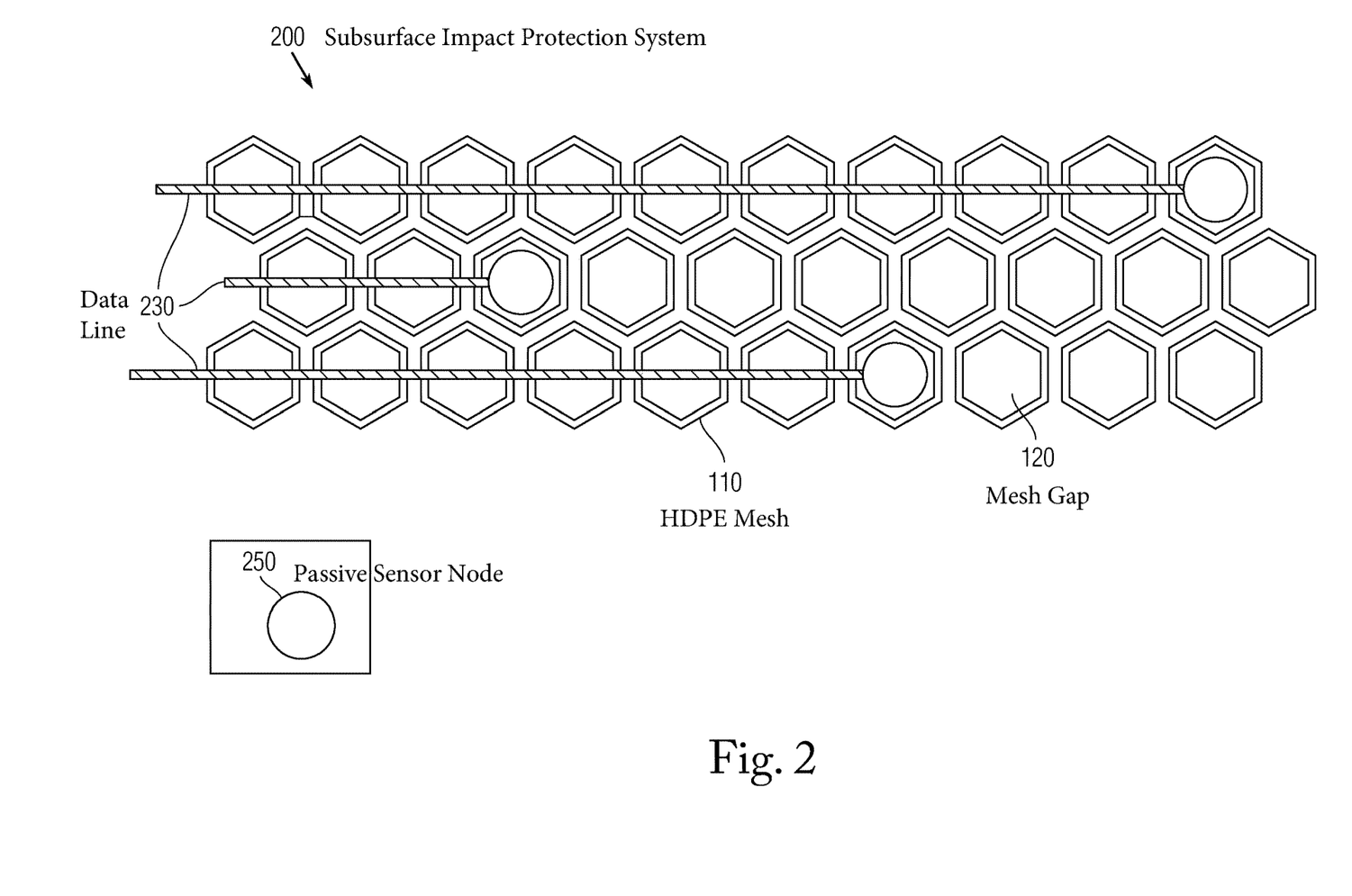
FIG. 2 is an illustration of an example sensor network embedded in a polymer layer of a subsurface impact protection system, according to another embodiment.

FIG. 2 is an illustration of an example sensor network embedded in a polymer layer of a subsurface impact protection system 200, according to another embodiment. The sensor network is an example of a passive sensor node mesh. Here, the protection system 200 includes a polymer (e.g., HDPE) mesh 110 similar to that of FIG. 1. The sensor network includes numerous passive sensor nodes 250. Passive sensors do not need an external power supply in order to operate. As such, each passive sensor node 250 is connected to only a data line 230 (e.g., wire) for transmitting corresponding sensor data from the passive sensor node 250.

In FIG. 2, example passive sensor nodes 250 include piezoelectric sensors, microelectromechanical systems (MEMS) capacitive sensors, thermal sensors, and seismic sensors, to name a few. For example, the passive sensor nodes 250 generate signals based on changes in the corresponding measured environmental conditions (such as pressure, temperature, humidity, and the like). The generated signals are transmitted along corresponding data lines 230 for eventual acquiring by an external processor or circuit configured (e.g., by code or logic) to process the data into useful information for later purposes (e.g., displaying, alerting, tracking, diagnosing).

Figure 3:
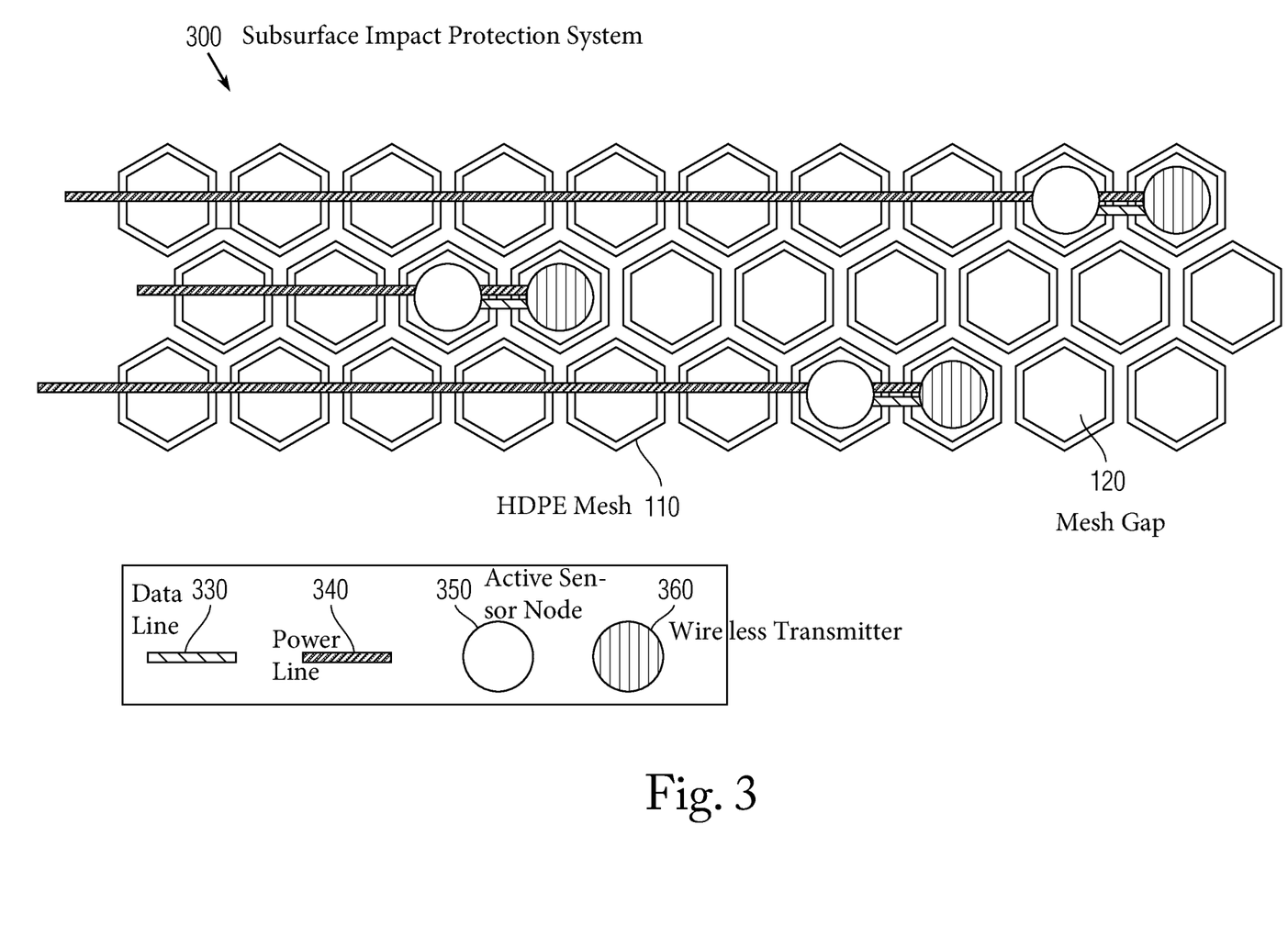
FIG. 3 is an illustration of an example sensor network embedded in a polymer layer of a subsurface impact protection system, according to yet another embodiment.

FIG. 3 is an illustration of an example sensor network embedded in a polymer layer of a subsurface impact protection system 300, according to yet another embodiment. The sensor network is an example of a set of sensor nodes 350 with external power and self-contained data transmission. Here, the protection system 300 includes a polymer (e.g., HDPE) mesh 110 similar to that of FIGS. 1 and 2. The sensor network includes numerous active sensor nodes 350 (like the active sensor nodes 150 of FIG. 1) connected to corresponding power lines 340, such as wires electrically connected to an external power source. In addition, the sensor network includes corresponding wireless transmitters 360 coupled to the power source through the power lines 340 and to the sensor nodes 350 through data lines 330.

In FIG. 3, a variant of the sensor network of FIG. 1 is presented. Here, each active sensor node 350 is connected to a corresponding wireless transmitter 360 capable of transmitting at a frequency, such as a radio frequency (RF) in the range 300 MHz to 2400 MHz, that can penetrate the underground. It should be noted that in some embodiments, the wireless transmitter 360 and sensor node 350 are separate units while in other embodiments, they are both incorporated within the same package (e.g., in the same mesh gap 120). In FIG. 3, the sensor nodes 350 are depicted separately from the wireless transmitters 360 (e.g., in adjacent or nearby mesh gaps 120), with data lines 330 connecting the corresponding pairs. The wireless transmitters 360 transmit corresponding sensor data from the sensor nodes 350 to appropriate receivers (e.g., above-ground receiving stations, underground relaying stations, underground central hubs, and the like).

Figure 4:
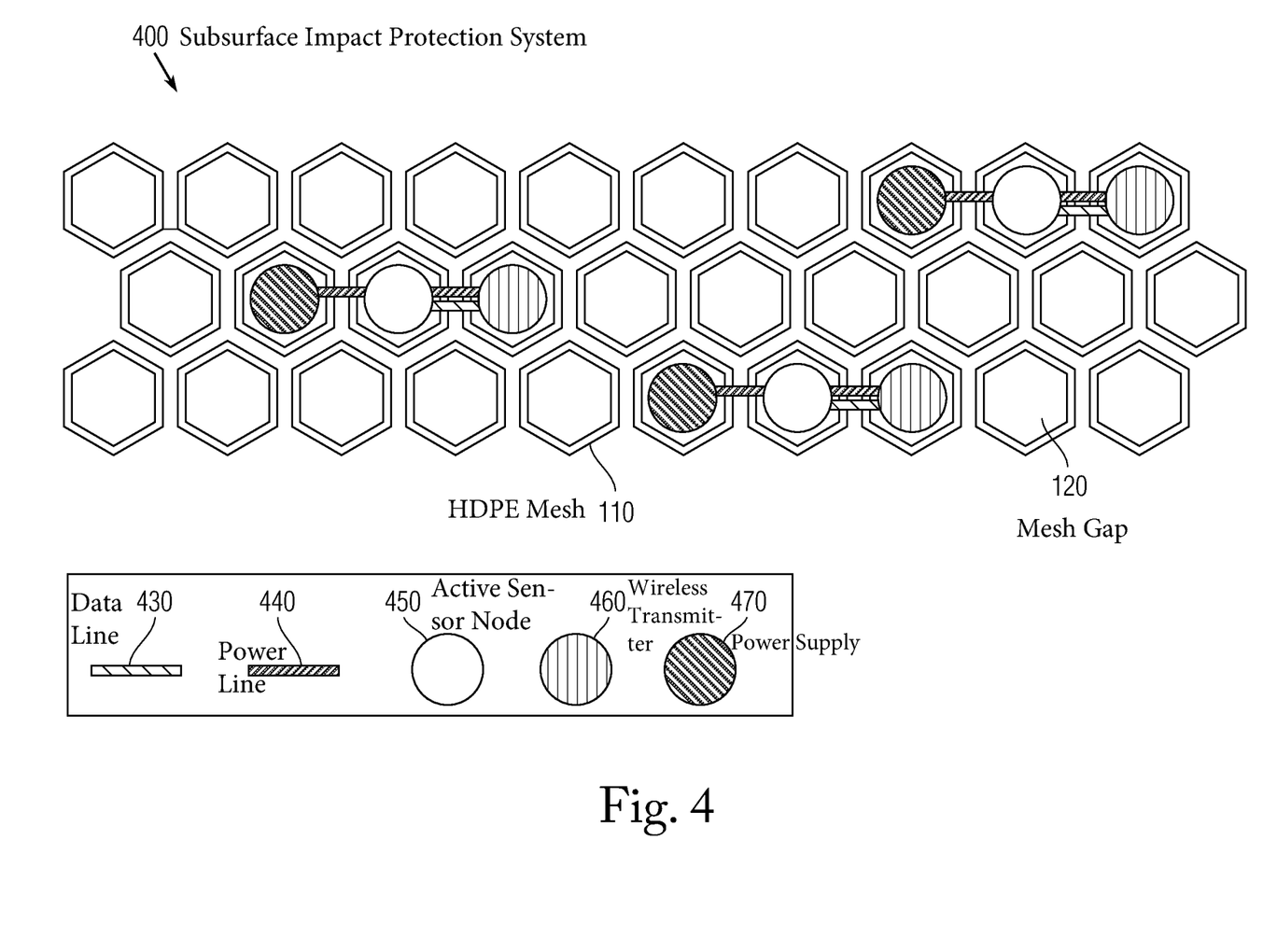
FIG. 4 is an illustration of an example sensor network embedded in a polymer layer of a subsurface impact protection system, according to still yet another embodiment.

FIG. 4 is an illustration of an example sensor network embedded in a polymer layer of a subsurface impact protection system 400, according to still yet another embodiment. The sensor network is an example of a set of self-contained sensor nodes 450 each having a power source 470 and wireless transmission unit 460. Here, the protection system 400 includes a polymer (e.g., HDPE) mesh 110 similar to that of FIGS. 1 through 3. The sensor network includes numerous active sensor nodes 450 (like the active sensor nodes 150 and 350) connected to corresponding power lines 440, such as wires connected to corresponding power supplies 470. In addition, like FIG. 3, the sensor network includes corresponding wireless transmitters 460, this time coupled to the power supplies 470 through the power lines 440 and to the sensor nodes 450 through the data lines 430.

In FIG. 4, a variant of the sensor network of FIG. 3 is presented. Here, each active sensor node 450 is a self-contained sensor unit embedded in the polymer mesh 110. In further detail, each active sensor node 450 is electrically connected to a nearby (e.g., in a close or adjacent mesh gap 120) power supply 470 and a nearby wireless transmitter 460. In some embodiments, the power supplies 470 are batteries that are replaced or recharged when discharged. In addition, in some embodiments, the sensor node 450, power supply 470, and transmitter 460 are separate connected components, while in some other embodiments, two or three of these components are contained within the same housing (e.g., in the same mesh gap 120). In some single-unit embodiments, all three of the sensor node 450, power supply 470, and transmitter 460 are connected together within the same housing and the same mesh gap 120.

There are a variety of ways of deploying or embedding the sensor network in the subsurface impact protection system. In some embodiments, the sensor network is pre-installed on spooled polymer mesh used to build the protection system. In some such embodiments, the sensors or sensor connection circuitry (or both) along with the data or power connections (or both the data and power connections) are installed in the polymer mesh during spooling of the polymer mesh material. In some such embodiments, the sensors and sensor connection circuitry are fixed in place using adhesive, such as an epoxy-based adhesive. In some such embodiments, any connection wires (if present) are also spooled with the polymer mesh. As such, when deploying the spooled polymer mesh material at the appropriate point above the assets to be protected, the corresponding sensor network is also deployed. Final connections, such as to above-ground power supply or sensor data receiving stations, can be performed after the spooled polymer mesh deployment.

In some other embodiments, the installation of the embedded sensor network takes place during the polymer mesh placement: This can be a more manual approach of installing the sensor network. For instance, in some such embodiments, an operator guides the sensor network wires (e.g., for power and data transmission) as well as inserts the sensors into the polymer mesh as the polymer mesh is inserted or otherwise installed underground.

Figure 5:
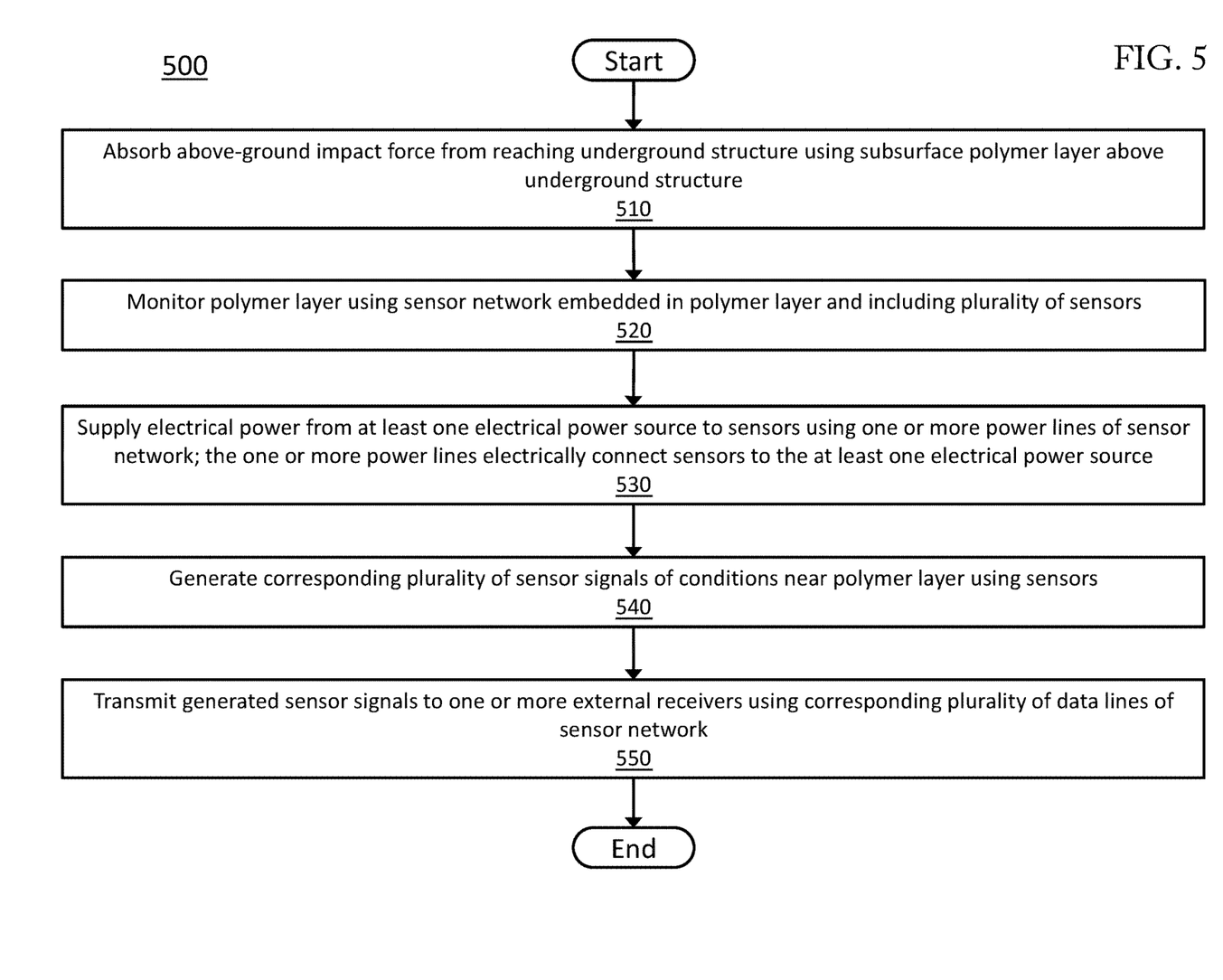
FIG. 5 is a flow diagram of an example method of impact protection of an underground structure using a sensor network that is embedded in a polymer layer of a subsurface impact protection system, according to an embodiment.

FIG. 5 is a flow diagram of an example method 500 of impact protection of an underground structure (such as a pipeline or storage vessel) using a sensor network. The sensor network is embedded in (e.g., part of, close to, or attached to) a polymer layer (such as HDPE mesh 110). The sensor network and polymer layer are part of a subsurface impact protection system (such as subsurface impact protection system 100, 200, 300, or 400), according to an embodiment.

Some or all of the method 500 can be performed using components and techniques illustrated in FIGS. 1 through 4. Portions of this and other methods disclosed herein can be performed on or using a custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can be, for example, a dedicated or shared hardware device (such as a laptop, a single board computer (SBC), a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the method 500 (or other disclosed method) to be carried out. It should be noted that in other embodiments, the order of the operations can be varied, and that some of the operations can be omitted. Some or all of the method 500 can also be performed using logic, circuits, or processors located on or in electrical communication with a subsurface impact protection system configured to carry out the method 500.

In the example method 500, processing begins with the step of absorbing 510 above-ground impact force from reaching the underground structure using the subsurface polymer layer. The polymer layer is above the underground structure. The method 500 further includes the step of monitoring 520 the polymer layer using the sensor network. The sensor network is embedded in the polymer layer and includes a plurality of sensors (such as active sensor nodes 150, 350, or 450). For example, in one embodiment, the sensors include one or more of a pressure sensor, a temperature sensor, and a humidity sensor.

The method 500 further includes the step of supplying 530 electrical power from at least one electrical power source to the sensors using one or more power lines (such as power lines 140, 340, or 440) of the sensor network. Here, the one or more power lines electrically connect the sensors to the at least one electrical power source. The method 500 further includes the step of generating 540 a corresponding plurality of sensor signals of conditions (e.g., environmental, operating) near the polymer layer using the plurality of sensors. In addition, the method 500 includes the step of transmitting 550 the generated sensor signals from the plurality of sensors to one or more external receivers (e.g., ground stations, relay points) using a corresponding plurality of data lines (such as data lines 130, 330, or 430) of the sensor network. For example, the steps 540 and 550 can be done using a control circuit (e.g., programmable processor or logic circuit) attached to each sensor (and corresponding power and data lines) and programmed to carry out the corresponding steps.

In some embodiments, the polymer layer includes an HDPE protective mesh. The protective mesh includes several HDPE strands in a woven pattern. Here, the sensors occupy gaps (such as mesh gaps 120) in the protective mesh. In some such embodiments, the sensor network further includes a corresponding plurality of wireless transmitters (such as wireless transmitters 360 or 460) connected to the plurality of sensors through the data lines. Here, the step of transmitting 550 the generated sensor signals includes delivering the generated sensor signals from the sensors to the wireless transmitters using the data lines, and wirelessly transmitting the delivered sensor signals to the one or more external receivers using the wireless transmitters.

The methods described herein may be performed in part or in full by software or firmware in machine readable form on a tangible (e.g., non-transitory) storage medium. For example, the software or firmware may be in the form of a computer program including computer program code adapted to perform some or all of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method of protecting and monitoring an underground structure, the method comprising:
   absorbing above-ground impact force from reaching the underground structure using a subsurface polymer mesh above the underground structure;
   monitoring the underground structure using a sensor network comprising a plurality of sensors embedded in the polymer mesh;
   determining an integrity of the polymer mesh using the sensor network,
   wherein the monitoring step comprises:
      generating, using the plurality of sensors, a corresponding plurality of sensor signals of conditions near the polymer mesh; and
      transmitting the generated corresponding plurality of sensor signals to one or more external receivers; and
   inferring a health of the underground structure and a surrounding underground area from the transmitted plurality of sensor signals and the determined integrity of the polymer mesh.

2. The method of claim 1, wherein the plurality of sensors comprises active sensors, and wherein the method further comprises supplying electrical power from at least one electrical power source to the active sensors using one or more power lines of the sensor network, wherein the one or more power lines electrically connect the active sensors to the at least one electrical power source.

3. The method of claim 1, wherein the sensor network further comprises a corresponding plurality of data lines connected to the plurality of sensors, and transmitting the generated corresponding plurality of sensor signals comprises transmitting the generated corresponding plurality of sensor signals using the corresponding plurality of data lines.

4. The method of claim 1, wherein the polymer mesh comprises high density polyethylene (HDPE).

5. The method of claim 1, wherein the polymer mesh comprises a plurality of polymer strands in a woven pattern.

6. The method of claim 5, wherein the plurality of sensors occupy gaps in the polymer mesh.

7. The method of claim 1, wherein:
   the sensor network further comprises a corresponding plurality of wireless transmitters connected to the plurality of sensors through a corresponding plurality of data lines; and
   transmitting the generated corresponding plurality of sensor signals comprises:
      delivering the generated corresponding plurality of sensor signals to the wireless transmitters using the corresponding plurality of data lines; and
      wirelessly transmitting the delivered generated corresponding plurality of sensor signals using the corresponding plurality of wireless transmitters.

8. The method of claim 7, wherein wirelessly transmitting the delivered generated corresponding plurality of sensor signals comprises using a radio frequency of between 300 megahertz (MHz) and 2400 MHz.

9. The method of claim 7, wherein:
   the polymer mesh comprises a plurality of polymer strands in a woven pattern;
   the plurality of sensors occupy first gaps in the polymer mesh; and
   the corresponding plurality of wireless transmitters occupy second gaps in the polymer mesh different from the first gaps.

10. The method of claim 1, wherein the plurality of sensors comprise one or more of a pressure sensor, a temperature sensor, and a humidity sensor.

11. A subsurface impact protection system for protecting and monitoring an underground structure, the protection system comprising:
    a subsurface polymer mesh above the underground structure and configured to absorb above-ground impact force from reaching the underground structure;
    a sensor network comprising a plurality of sensors embedded in the polymer mesh and configured to determine an integrity of the polymer mesh, wherein the sensor network is further configured to monitor the underground structure by:
       generating, using the plurality of sensors, a corresponding plurality of sensor signals of conditions near the polymer mesh; and
       transmitting the generated corresponding plurality of sensor signals to one or more external receivers; and
    a control circuit configured to infer a health of the underground structure and a surrounding underground area from the transmitted plurality of sensor signals and the determined integrity of the polymer mesh.

12. The protection system of claim 11, wherein the plurality of sensors comprise active sensors, and wherein the sensor network further comprises one or more power lines electrically connecting the active sensors to at least one electrical power source, the one or more power lines being configured to supply electrical power from the at least one electrical power source to the active sensors.

13. The protection system of claim 11, wherein the sensor network further comprises a corresponding plurality of data lines connected to the plurality of sensors, and transmitting the generated corresponding plurality of sensor signals comprises transmitting the generated corresponding plurality of sensor signals using the corresponding plurality of data lines.

14. The protection system of claim 11, wherein the polymer mesh comprises high density polyethylene (HDPE).

15. The protection system of claim 11, wherein the polymer mesh comprises a plurality of polymer strands in a woven pattern.

16. The protection system of claim 15, wherein the plurality of sensors occupy gaps in the polymer mesh.

17. The protection system of claim 11, wherein:
the sensor network further comprises a corresponding plurality of wireless transmitters connected to the plurality of sensors through a corresponding plurality of data lines; and
transmitting the generated corresponding plurality of sensor signals comprises:
delivering the generated corresponding plurality of sensor signals to the wireless transmitters using the corresponding plurality of data lines; and
wirelessly transmitting the delivered generated corresponding plurality of sensor signals using the corresponding plurality of wireless transmitters.

18. The protection system of claim 17, wherein wirelessly transmitting the delivered generated corresponding plurality of sensor signals comprises using a radio frequency of between 300 megahertz (MHz) and 2400 MHz.

19. The protection system of claim 17, wherein:
the polymer mesh comprises a plurality of polymer strands in a woven pattern;
the plurality of sensors occupy first gaps in the protective polymer mesh; and
the corresponding plurality of wireless transmitters occupy second gaps in the polymer mesh different from the first gaps.

20. The protection system of claim 11, wherein the plurality of sensors comprise one or more of a pressure sensor, a temperature sensor, and a humidity sensor.

\* \* \* \* \*